(No Model.)
W. A. CLARK.
APPARATUS FOR PURIFYING MILK.
No. 535,890.   Patented Mar. 19, 1895.
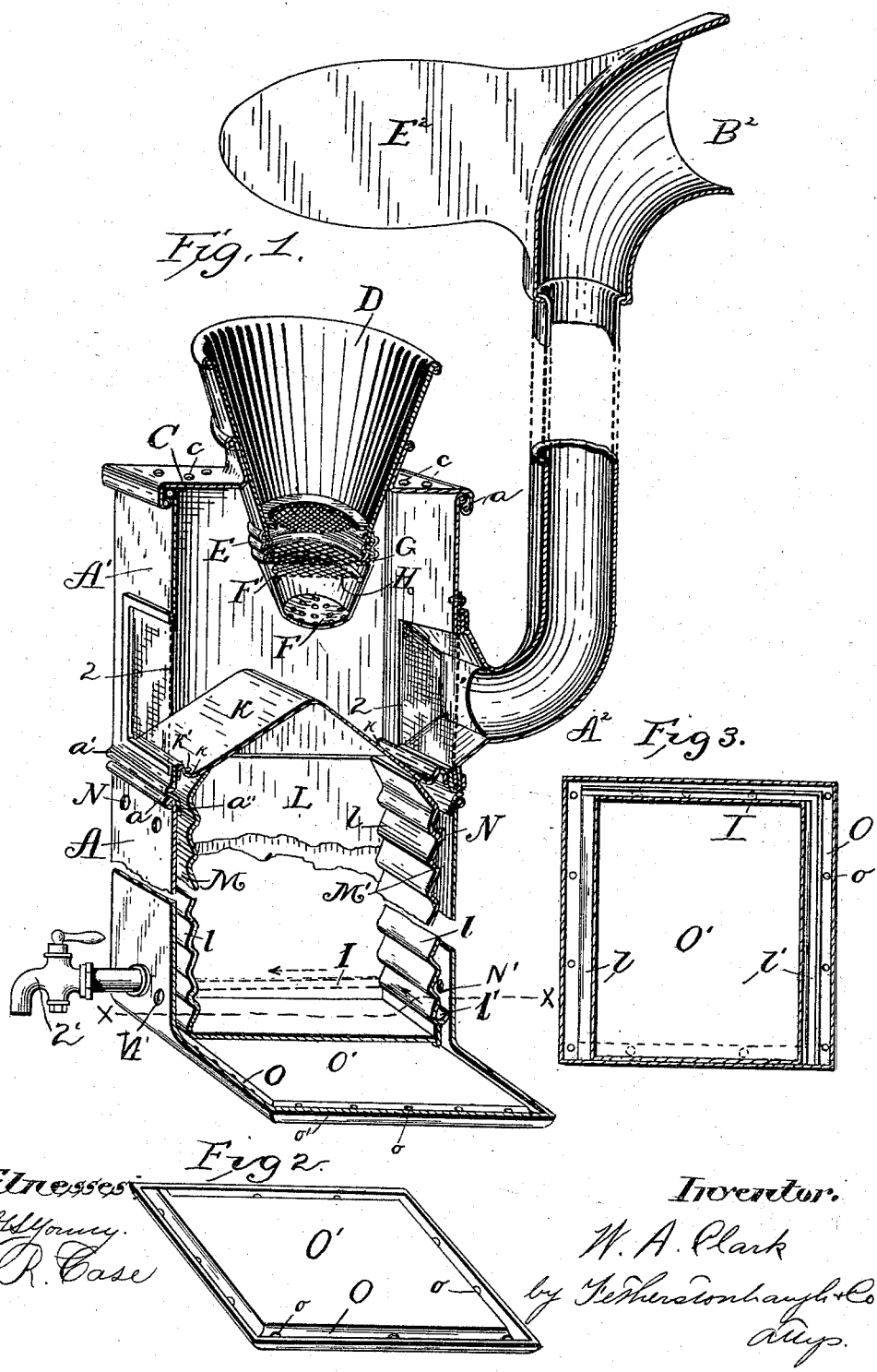

UNITED STATES PATENT OFFICE.

WILLIAM ALBERT CLARK, OF TORONTO, CANADA.

APPARATUS FOR PURIFYING MILK.

SPECIFICATION forming part of Letters Patent No. 535,890, dated March 19, 1895.

Application filed October 2, 1893. Renewed November 12, 1894. Serial No. 528,539. (No model.)

*To all whom it may concern:*

Be it known that I, WILLIAM ALBERT CLARK, of the city of Toronto, in the county of York, in the Province of Ontario, Canada, have invented certain new and useful Improvements in Apparatus for Purifying Milk, of which the following is a specification.

The object of the invention is to design an apparatus whereby milk may have all the impurities removed from it and chilled preparatory to being bottled; and the invention consists of a simple arrangement of strainers and distributers and aerating and chilling chambers as more particularly hereinafter explained.

In the accompanying drawings, Figure 1, is a perspective view of my improved apparatus in section and partly broken away. Fig. 2, is a view of the bottom of the casing. Fig. 3, is a section on line $x$—$x$ Fig. 1.

A A' is a rectangular casing formed in two separate parts, the lower portion A being supported in any suitable way, but preferably upon legs as shown in a pending application filed by me on the 5th day of May, 1893, Serial No. 469,874, in which I have shown a receiving chamber, forming in practice the lower part of the present apparatus and receiving the chilled milk for bottling. The upper part of the portion A, has a wire rim or edge $a$, and the lower part of the portion A', has a flange $a'$, formed around it and a projecting edge $a''$, the flange $a'$ being designed to rest upon the wire rim $a$, and the edge $a''$ projecting down within the portion A so as to hold the portion A' in position directly above the portion A.

C, is a removable cover fitted on to the top of the portion A', and provided with openings, or holes $c$. The top C has a milk receptacle D, extending through it which is provided at its bottom with a strainer E. The strainer E is attached to or forms part of the milk receptacle D.

F, represents the bottom strainer of the milk receptacle, which is attached to or forms part of the cap which is screwed or secured on to the lower threaded end of the milk receptacle D. Situated immediately beneath the strainer E, is a straining cloth G, which is secured in position around the edge between the male and female threads formed at the bottom of the milk receptacle and at the top of the cap F', respectively as shown. H, is also a straining cloth secured to a ring which is placed above the strainer F, in the tapered cap F'. The upper straining cloth G is preferably coarser than the lower straining cloth H.

2, are rectangular openings made on each side of the casing A', the openings being preferably covered with a wire mesh and designed to allow of a current or draft of air passing through the casing below the milk receptacle.

K is a ridged diaphragm which has channels $k$ formed at each side. Along the center of each channel $k$ is made a series of holes $k'$.

L, is a cooling or chilling chamber, which is designed to be filled or partially filled with ice. The chamber L has corrugated sides $l$ extending from beneath the channel $k$, to the bottom O' of the casing A. The corrugations are formed preferably as shown. There might be arranged openings between each corrugation but I think that it is sufficient for the purpose of chilling the milk to make the closed corrugated sides as shown. At the base of the corrugations on one side is provided a channel $l'$ which directs the milk to the supplemental channel I, which conveys the milk to the channel O in the bottom O'. The channel O extends around the sides of the bottom O' as shown and is slightly inclined throughout its length, so as to cause the milk to gradually flow along it.

M, M' are passage ways which are formed between the corrugated sides $l, l$, and the sides of the casing A.

N, N' are openings made in the top and bottom of the casing A.

$o$, is a series of holes which are made throughout the length of the channel O, as shown in Fig. 1. The upper end of the incline of the channel O starts from the side of the bottom O' while the lower end abuts the ridge $o'$.

2', is a faucet the inner end of which is screwed through the sides of the casing A into the end of the ice chamber L. This faucet is designed to drain off the water from the melted ice.

The air for aerating the milk enters a screened opening 2 through a duct $A^2$ which has a swiveled extension provided with a cowl $B^2$ having a vane or wing $E^2$ which keeps the cowl always with its open end in line with the direction of the wind and thus a circulation is constantly maintained.

Having now described the principal parts involved in my invention I shall proceed to describe the manner in which the milk is cleansed from all impurities and then chilled and bottled.

The milk is poured into the receptacle D, and passes through the strainer E, coarse straining cloth G, finer straining cloth H, and strainer F, and showers down upon the ridged diaphragm K which divides the shower. In passing through the strainers E and F and straining cloths G and H all sediment or tangible impurities are removed from the milk. The current or draft passing through the openings 2, serves to aerate the milk and remove all germ impurities from it. The purified milk now passes through holes $k'$ in the channels $k$, and drips from one corrugation to another down the corrugated sides $l$, of the chilling chamber L until it reaches the bottom corrugation on each side where it will be noticed that the corrugation or channel $l'$ in the passage way M' on one side slants toward the end of the supplemental channel I and conveys the milk to that end, where it flows down into the channel O. From the passage on the opposite side the milk falls directly into the channel O beneath the passage way. The milk will first pass through the holes $o$, near the upper end of the channel O and then to the next one and so on until it reaches the end hole at the lower end and in so passing along the channel O it will serve to fill the bottles placed beneath the opening $o$ as in my pending case referred to.

I claim—

In combination, the casing, a milk receptacle D, strainers therein, a ridged diaphragm, a chilling chamber beneath having side passages between it and the walls of the receptacle, a bottom for said receptacle having a marginal perforated channel, and a trough or channel located on the outer wall of the chilling chamber above the perforated bottom and directing the milk flowing down the sides of said chamber to the point of discharge into the bottom channel from whence it flows through the perforations to suitable receptacles, substantially as described.

WILLIAM ALBERT CLARK.

Witnesses:
B. BOYD,
H. G. S. YOUNG.